US 7,653,860 B2

(12) United States Patent
Younkin et al.

(10) Patent No.: US 7,653,860 B2
(45) Date of Patent: *Jan. 26, 2010

(54) TRANSMIT DRIVER DATA COMMUNICATION

(75) Inventors: Kenton A. Younkin, San Diego, CA (US); Sten Jorgen Dahl, San Diego, CA (US); Devarshi Shah, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 242 days.

This patent is subject to a terminal disclaimer.

(21) Appl. No.: 11/558,852

(22) Filed: Nov. 10, 2006

(65) Prior Publication Data
US 2007/0089021 A1    Apr. 19, 2007

Related U.S. Application Data

(63) Continuation-in-part of application No. 11/373,606, filed on Mar. 9, 2006.

(60) Provisional application No. 60/816,698, filed on Jun. 26, 2006, provisional application No. 60/660,906, filed on Mar. 10, 2005.

(51) Int. Cl.
*H03M 13/00* (2006.01)
(52) U.S. Cl. .................. 714/755; 714/786; 714/781; 714/785; 714/784
(58) Field of Classification Search ................ 714/755, 714/785–786, 781, 758
See application file for complete search history.

(56) References Cited

U.S. PATENT DOCUMENTS

| 5,878,217 | A | 3/1999 | Cherukuri |
| 2003/0227851 | A1* | 12/2003 | Furuta et al. ............ 369/59.22 |
| 2005/0135308 | A1 | 6/2005 | Vijayan et al. |
| 2005/0141475 | A1 | 6/2005 | Vijayan et al. |
| 2006/0218472 | A1* | 9/2006 | Dahl et al. .................. 714/776 |

FOREIGN PATENT DOCUMENTS

| EP | 0752801 | 1/1997 |
| EP | 1484867 | 12/2004 |
| WO | 2005022811 | 3/2005 |

OTHER PUBLICATIONS

International Search Report—PCT/US07/072031, International Search Authority—European Patent Office—Jan. 21, 2008.

* cited by examiner

*Primary Examiner*—Guy J Lamarre
(74) *Attorney, Agent, or Firm*—Gerald P. Joyce, III

(57) ABSTRACT

Aspects describe a transmit driver that processes data communication between a scheduler and a turbo encoder. Transmit driver receives a request for a super frame and ascertains whether it has enough information to start the super frame. If there is enough data, the super frame is written to an appropriate hardware register. Both Direct Memory Access (DMA) and non-DMA hardware can be supported with the one or more aspects. In an aspect, a method is provided for data transmission. The method includes obtaining data comprising one or more logical channels wherein each of the logical channels comprises one or more code blocks, and wherein each of the code blocks comprises one or more turbo groups, organizing the data based on the one or more code blocks to produce time-sequenced turbo groups, and outputting the time-sequenced turbo groups.

40 Claims, 15 Drawing Sheets

TRANSMIT DRIVER DATA COMMUNICATION

CLAIM OF PRIORITY UNDER 35 U.S.C. §119

The present Application for Patent claims priority to Provisional Application No. 60/816,698 entitled "MULTIPLEX SERVER (MUX)" filed Jun. 26, 2006, and assigned to the assignee hereof and hereby expressly incorporated by reference herein.

CLAIM OF PRIORITY UNDER 35 U.S.C. §120

The present Application for Patent is a continuation-in-part of patent application Ser. No. 11/373,606 entitled "A TRANSMIT DRIVER IN COMMUNICATION SYSTEM" filed Mar. 9, 2006, pending which claims priority to Provisional Application No. 60/660,906 filed Mar. 10, 2005, and assigned to the assignee hereof and hereby expressly incorporated by reference herein.

BACKGROUND

I. Field

The following description relates generally to communication systems and, amongst other things, to data transmission in a communication system.

II. Background

A technique for broadcasting (by mobility standards) high rate data signals (e.g., high frame rate video) is Orthogonal Frequency Division Multiplexing (OFDM). OFDM is a parallel transmission communication scheme where a high-rate data stream is split over a large number of lower-rate streams and transmitted simultaneously over multiple sub-carriers spaced apart at particular frequencies or tones. The precise spacing of frequencies provides orthogonality between tones. Orthogonal frequencies minimize or eliminate crosstalk or interference amongst communication signals. In addition to high transmission rates, and resistance to interference, high spectral efficiency can be obtained as frequencies can overlap without mutual interference.

Multicasting technology for transmission of multimedia has been developed by an industry group of wireless communication service providers to utilize the latest advances in system design to achieve the highest-quality performance. Industry-accepted technologies, such as Forward Link Only (FLO) and Digital Video Broadcast (DVB) are intended for a mobile multimedia environment and is suited for use with mobile user devices. In particular, FLO technology can provide robust mobile performance and high capacity without compromising power consumption. In addition, the technology reduces the network cost of delivering multimedia content by decreasing the number of base station transmitters that are needed to be deployed. Furthermore, FLO technology based multimedia multicasting is complimentary to the wireless operators' cellular network data and voice services, delivering content to the same mobile devices.

Multicast systems support different types of services, such as real-time services, non-real-time services, IP datacast services, and common overhead service. Real-time services involve streaming of media content (e.g., audio, audio and video, and the like). Non-real-time services involve the delivery of media files (clips), which can be stored on a device and accessed by a user during a planned availability period. Non-real-time services can be referred to as clipcast services. IP datacast services are wireless IP multicast services for a wide range of applications. Common overhead services carry system overhead data.

Different types of services call for different Quality of Services (QoS). For example, real-time services have strict latency needs but can tolerate some packet errors. Non-real-time services are intended to be delivered at the devices before the advertised availability period and, therefore, have an associated deadline. Non-real-time services are delivered as files (e.g., clips), and thus, should conform to strict packet error mitigation. QoS necessary for an IP datacast service depends on the application intended on that service. Common overhead service carries important system overhead information that should be received at the device with low acquisition delays. Therefore, common overhead service should have low latency and low packet error rates. In multicast systems, there are various functions that collaborate to achieve the necessary QoS for different services. These functions are collectively termed as resource management functions.

Efficient data communication reduces system latency and error rates. Therefore, what is needed is a technique for providing efficient data communication in a wireless notebook.

SUMMARY

The following presents a simplified summary of one or more aspects in order to provide a basic understanding of some aspects of such aspects. This summary is not an extensive overview of the one or more aspects, and is intended to neither identify key or critical elements of the aspects nor delineate the scope of such aspects. Its sole purpose is to present some concepts of the described aspects in a simplified form as a prelude to the more detailed description that is presented later.

In accordance with one or more aspects and corresponding disclosure thereof, various aspects are described in connection with data transmission. According to an aspect is a method for data transmission. The method includes maintaining a sorted list of turbo groups. Logical channel (LC) can comprise about four or more turbo groups. A turbo group can comprise about four turbo packets. The method further includes receiving a request from an encoder for a super frame and ascertaining if enough data is available to process the super frame by analyzing the maintained list of turbo groups. If there is enough data available, the super frame is sent to one or more registers associated with a direct memory access hardware component or a non-direct memory access hardware component.

According to another aspect is an apparatus for data transmission. The apparatus includes a receiver, a storage medium, an analyzer, and a writer. The receiver can receive a request for a super frame and the storage medium can maintain a list of turbo groups. Upon receipt of the request by receiver, the analyzer can analyze the maintained list of turbo groups and determine if there is data available to being a super frame based on the received request. If there is data available, the writer writes the super frame to a hardware register.

In another aspect, a computer readable medium having a computer program for data transmission maintains a list of turbo groups. The computer program further receives a request for a super frame and analyzes the maintained list of turbo groups to determine if data is available to being a super frame based on the received request. If the data is available, the super frame is written to a hardware register.

In yet another aspect, an apparatus for communicating data includes a means for maintaining a list of turbo groups, a means for receiving a super frame request, and a means for reviewing the maintained list to determine if data is available to complete the request. If the data is available to complete the request, a means for transmitting the super frame to a register outputs the requested data.

According to another aspect is a processer that executes instructions for data communication. The instructions include sorting a listing of turbo groups; wherein a turbo group includes at least four turbo pockets and a logical channel (LC) includes a least four groups of four turbo packets, the sorted list of turbo groups are stored. The instructions further include receiving a request for a super frame and determining, if enough data is available to process the super frame by analyzing the stored list of turbo groups. If there is enough data available, the super frame is output to a hardware component.

In an aspect, a method is provided for data transmission. The method comprises obtaining data comprising one or more logical channels wherein each logical channel comprises one or more code blocks, and wherein each of the code blocks comprises one or more turbo groups, organizing the data based on the one or more code blocks to produce time-sequenced turbo groups, and outputting the time-sequenced turbo groups.

In an aspect, an apparatus is provide for data transmission. The apparatus comprises input logic configured to obtain data comprising one or more logical channels wherein each of the logical channels comprises one or more code blocks, and wherein each of the code blocks comprises one or more turbo groups, processing logic configured to organize the data based on the one or more code blocks to produce time-sequenced turbo groups, and output logic configured to output the time-sequenced turbo groups.

In an aspect, an apparatus is provided for data transmission. The apparatus comprises means for obtaining data comprising one or more logical channels wherein each of the logical channels comprises one or more code blocks, and wherein each of the code blocks comprises one or more turbo groups, means for organizing the data based on the one or more code blocks to produce time-sequenced turbo groups, and means for outputting the time-sequenced turbo groups.

In an aspect, a computer-readable medium is provided that has a computer program comprising instruction, which when executed by at least one processor, operate to provide a system for data transmission. The computer program comprises instructions for obtaining data comprising one or more logical channels wherein each of the logical channels comprises one or more code blocks, and wherein each of the code blocks comprises one or more turbo groups, instructions for organizing the data based on the one or more code blocks to produce time-sequenced turbo groups, and instructions for outputting the time-sequenced turbo groups.

In an aspect, at least one processor is provided that is configured to perform a method for data transmission. The method comprises obtaining data comprising one or more logical channels wherein each of the logical channels comprises one or more code blocks, and wherein each of the code blocks comprises one or more turbo groups, organizing the data based on the one or more code blocks to produce time-sequenced turbo groups, and outputting the time-sequenced turbo groups.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following description when considered in conjunction with the drawings and the disclosed aspects are intended to include all such aspects and their equivalents.

DESCRIPTION

Figure 1:
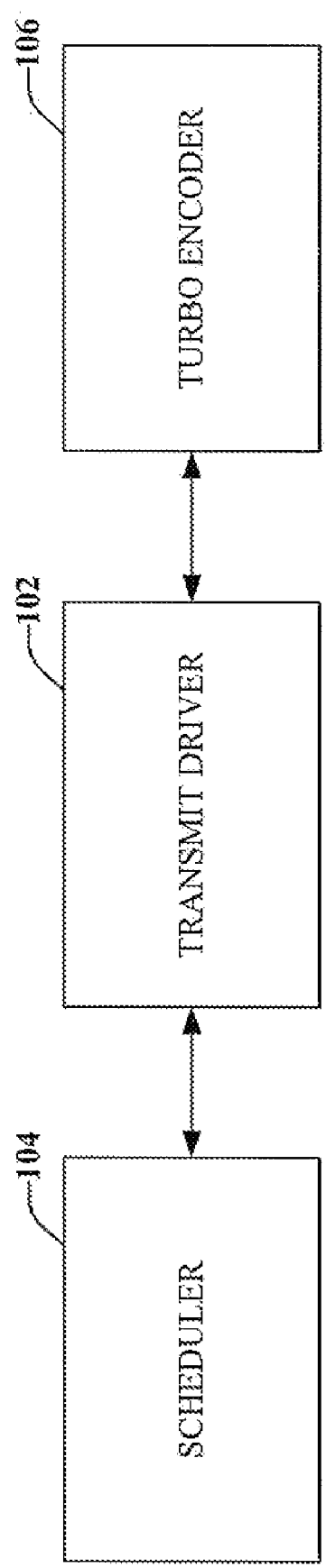
FIG. 1 is a block diagram of a data transmission system.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a user device. A user device can also be called a system, a subscriber unit, subscriber station, mobile station, mobile device, remote station, access point, base station, remote terminal, access terminal, handset, host, user terminal, terminal, user agent, or user equipment. A user device can be a cellular telephone, a cordless telephone, a Session Initiation Protocol (SIP) phone, a wireless local loop (WLL) station, a PDA, a handheld device having wireless connection capability, or other processing device(s) connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disk (DVD) . . . ), smart cards, and flash memory devices (e.g., card, stick, key drive . . . )

Various aspects will be presented in terms of systems that may include a number of components, modules, and the like. It is to be understood and appreciated that the various systems may include additional components, modules, etc. and/or may not include all of the components, module etc. discussed in connection with the figures. A combination of these approaches may also be used.

With reference now to the drawings, FIG. 1 illustrates a system 100 for data transmission. System 100 can be configured to supply data to hardware for over the air transmission in a time-prioritized manner, wherein the data can be prioritized according to a starting symbol. To appreciate fully the one or more aspects disclosed herein, a brief overview of communication concepts will now be discussed. A frame is a packet of data and its data channel is composed of up to 295 OFDM symbols and seven slots. The intersection between a symbol and a slot is referred to as a "data slot" and there are up to 2065 data slots per frame. A Turbo Packet comprises 125 bytes of data and a Reed-Solomon (RS) Code block comprises 16 turbo packets. A Logical Channel (LC) can include one or more RS Code blocks.

A super frame includes local overhead information symbols (LOI), wide overhead information symbols (WOI), and around four frames of LC data. Media streams may be transmitted as a group of LCs distributed over multiple super frames. For transmission, each RS code block of an LC is divided into about four groups of four turbo packets. There is one turbo packet group of a given RS code block transmitted per frame.

With reference again to FIG. 1, system 100 can buffer at least two super frames worth of data at substantially the same time. For example, system 100 can transmit one super frame of data while building the next super frame. For non-Direct Memory Access (non-DMA) hardware, LCs should be scheduled to span at least two symbols. System 100 can be configured to support about 256 LCs per super frame and approximately 256 RS code blocksper LC. One local overhead information data group comprised of about seven turbo packets, and one wide overhead information data group comprised of about seven turbo packet should be supported per super frame where the overhead information symbol (OIS) may contain information for up to 256 LCs.

System 100 includes a transmit driver 102 that can operate on a computer, such as a personal computer. Transmit driver 102 can be configured to operate as an interface between a scheduler 104 and a turbo encoder 106. Turbo encoder 106 and scheduler 104 can be applications residing in a computer and can be accessed through a peripheral control interconnect (PCI) interface bus, for example. However, it should be understood and appreciated that other techniques for accessing these components can be utilized. Scheduler 104 can provide LC data streams to transmit driver 102, which can communicate the LC data streams to turbo encoder 106 through one or more function calls, for example. Turbo encoder 106 can accept the LC data streams and encode them for over the air (e.g., wireless) transmission.

Scheduler 104 (also referred to as Transmit (Tx) driver client) can interact with transmit driver 102 through various function calls including: a TxOpen function call, a TxClose function call, a TxSuperFrameSend function call, and/or a TxDiagnostic function call. Scheduler 104 can allocate or designate transmit driver 102 by invoking the TxOpen function. Along with (either embedded or separate) the function call, a callback function pointer can be supplied. The callback function can be utilized to notify the client or scheduler 104 when a super frame has completed, and of error conditions (e.g., transmit driver requests a super frame but does not receive it before expiration of a time out, etc.). Turbo encoder 106 can notify scheduler 104 through transmit driver 102 that an error has occurred (e.g., data transmit error, etc.) To deallocate transmit driver 102, scheduler 104 can invoke the TxClose function call.

Tx driver client or scheduler 104 can provide media to transmit driver 102 one super frame at a time by invoking the TxSuperFrameSend function call. Scheduler 104 can provide the LOI data, WOI data, and a list of LCs that might be transmitted during that super frame. Transmit driver 102 can double buffer the super frames and notify scheduler 104 when a super frame buffer is available. Diagnostic functions can be performed when scheduler 104 invokes the TxDiagnostic function and supplies appropriate diagnostic data to carry out such diagnostic function.

Turbo encoder 106 can interact with system 100 and can transmit about seven data slots simultaneously, one per slot for any given symbol. Turbo encoder 106 can be configured as a ping-pong buffer for seven LCs capable of storing two turbo groups each. Control registers for each buffer that specify the starting symbol, slot, number of slots (height), and encoding mode can also be provided by turbo encoder 106. Turbo encoder 106 can further be configured as a status register for each buffer indicating whether the buffer is idle or in use and can generate interrupts to signal idle buffers.

Transmit driver 102 may be operating on a computer that may also be performing scheduling, Reed Solomon encoding, and/or other logistical activities. Thus, the processing should be as efficient as possible in terms of CPU time. In the computer environment, memory can be added at a minimal cost, and therefore, memory can be utilized when such usage results in reduced CPU usage. Copying of data can be minimized by passing a pointer to a single instance of data, which can result in more memory usage since at least two super frames of data may need to be buffered by the client.

For non-DMA hardware, turbo encoder 106 can use small buffers and have continuous interaction with transmit driver 102 to supply the data stream. This can be achieved with low latency, high priority interrupt processing. A thread safe design can be employed that does not use semaphore access guards. In accordance with some aspects, the client can provide the majority of data buffering, and, therefore, less than around one kilo-byte of statically allocated RAM might be used.

Figure 2:
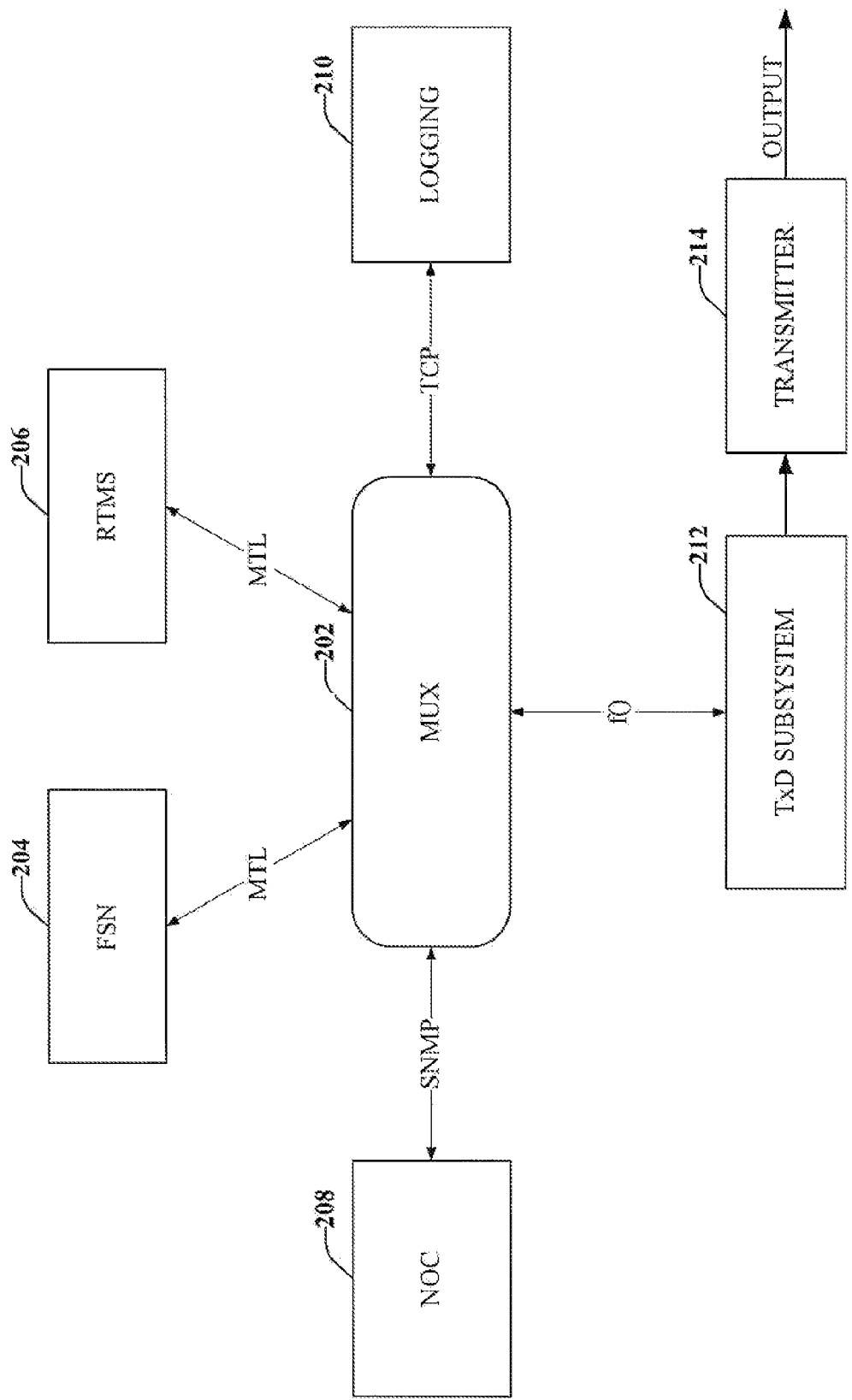
FIG. 2 is a block diagram of a system illustrating multiplex server (MUX) external interfaces that includes a transmit driver subsystem.

For a better understanding of the context of the one or more aspects disclosed herein, FIG. 2 is a block diagram of a system 200 illustrating multiplex server (MUX) external interfaces that includes a transmit driver subsystem. System 202 can include a MUX 202, a transcoder Serving Node (FSN) 204, a Real Time Media Server (RTMS) 206, a Network Operations Center (NOC) 208, Logging Component 210, and Transmit Driver (TxD) Subsystem 212. TxD Subsystem 212 can include various components to complete its functionality including, a scheduler, a transmit driver, and/or a turbo encoder. Transmit driver subsystem 212 can interface with a transmitter 214 conFIGured to output over the air communication. FSN 204 and RTMS 206 can produce data while TxD subsystem 212 consumes data. NOC 208 and Logging 210 have separate interfaces to MUX 202.

MUX 202 is a component that belongs to a multicast network and can implement an air interface stack for a transmitter subsystem and can interact with other components (e.g., transcoder serving nodes) to obtain data to be transmitted on a per second basis (a "super frame"). Scheduling can be performed by MUX 202 to decide the permissible sizes for individual flows depending on the characteristics of the flows and their momentary bandwidth needs. MUX 202 can then format the data and messages and pass such data and messages to a transmit driver subsystem 212 for further transmission or output over the air (e.g., wireless).

MUX 202 has operational interfaces with FSN subsystem 204 and with TxD subsystem 212. Management interfaces can include an interface with NOC 208 and one interface for logging 210. Each interface can utilize a different mechanism for communication. For example, NOC 208 can use Simple Network Management Protocol (SNMP) to communicate with MUX 202. Logging packets can be sent using the Transmission Control Protocol (TCP). Signaling and bearer data within the RTMS 206 and FSN 204 interface can use Message Transport Layer (MTL) (or Transmission Control Protocol/Internet Protocol (TCP/IP)) messages to communicate. The TxD subsystem 212 interface can consist of function calls. Such function calls can be utilized to request super frames from MUX 202. TxD subsystem 212 may then pass the super frames directly to a turbo encoder or may, for example, format them utilizing a MPEG2 Transport stream format for transmission over ASI.

TxD Subsystem 212 can interface by requesting MUX 202 to deliver a super frame through a function call (SF CMD). MUX 202, in reply, can transfer a super frame through a SF IND message to TxD subsystem 212. MUX 202 can buffer the super frames at substantially the same time as they are processed by TxD subsystem 212 and each time MUX 202 receives a SF CMD, it can release the super frame that was just processed by the TxD subsystem 212.

Figure 3:
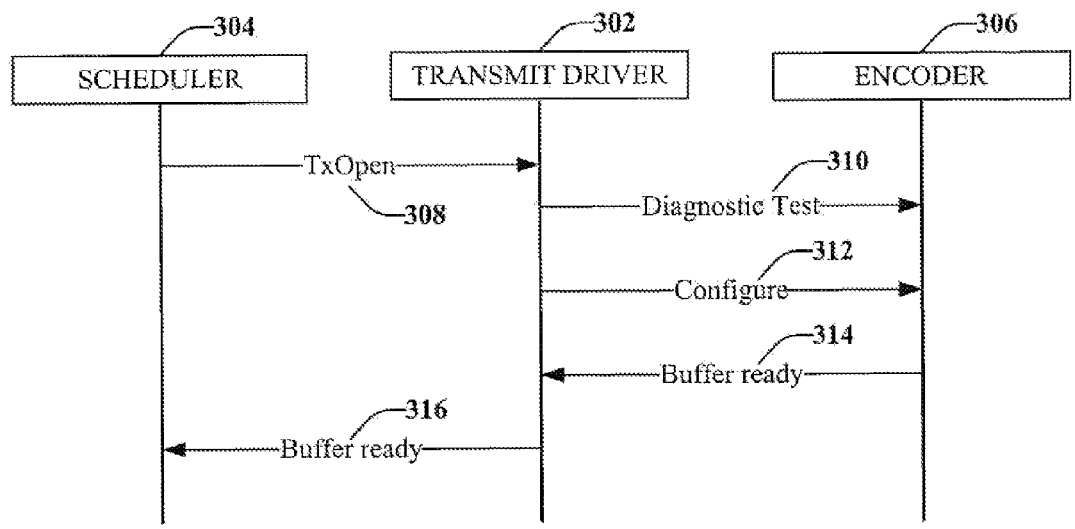
FIG. 3 is a flow diagram representing interactions to open a transmit driver.

FIG. 3 is a flow diagram 300 representing interactions to open a transmit driver. As illustrated, a transmit driver 302 provides an interface between a scheduler 304 and a turbo encoder 306. Scheduler 304 provides LC data streams to transmit driver 302, which accepts the LC data streams and encodes them for over the air (e.g., wireless) transmission.

Client or scheduler 304 allocates or designates transmit driver 302 by invoking a TxOpen function call 308. A callback function pointer can be included as part of (or sent at substantially the same time as) the TxOpen function 308. The callback function pointer can be utilized by transmit driver 302 to notify scheduler 304 when a super frame has completed, and/or when there are error conditions. Memory allocation failures can be handled by notifying scheduler 504 that an error has occurred.

After or at substantially the same time as receipt of the TxOpen function 308, transmit driver 302 initiates and runs an initial diagnostic test 310 on the turbo encoder 306 to which it interfaces. At substantially the same time as the diagnostic test is being performed, or after completion of the test, transmit driver 302 configures 312 the hardware associated with turbo encoder 306. When the turbo encoder is ready, a notification 314 is sent to transmit driver 302 and transmit driver 302 notifies scheduler 304 that it is ready to receive a super frame 316.

Figure 4:
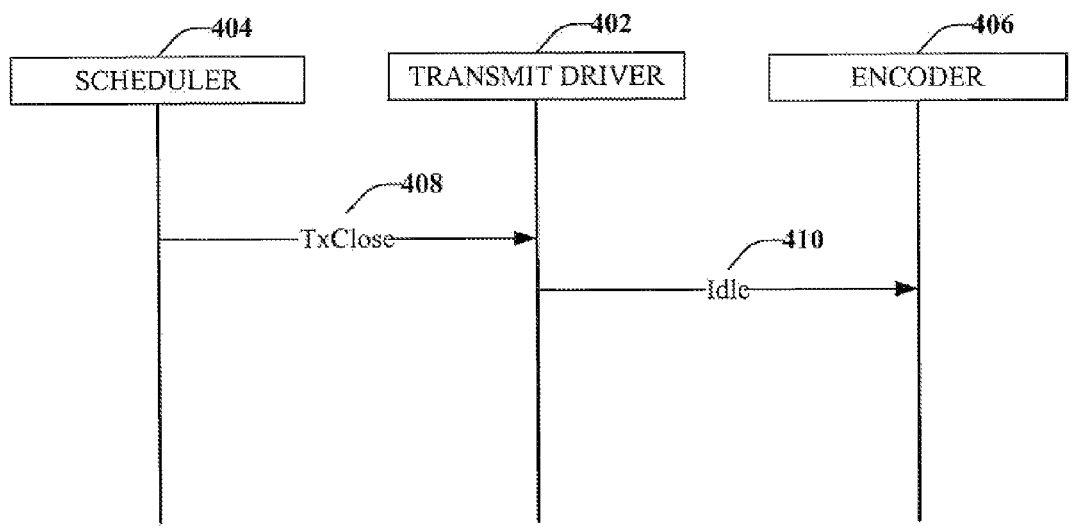
FIG. 4 is a flow diagram representing interactions to close a transmit driver.

FIG. 4 is a flow diagram 400 representing interactions to close a transmit driver. Transmit driver 402 can be deallocated or deselected by scheduler 404, upon receipt of a TxClose function call 408. At substantially the same time as receiving the TxClose function call 408, transmit driver 402 transmits an idle signal 410 to place the hardware or turbo encoder 406 in an idle state and to release internal resources.

Figure 5:
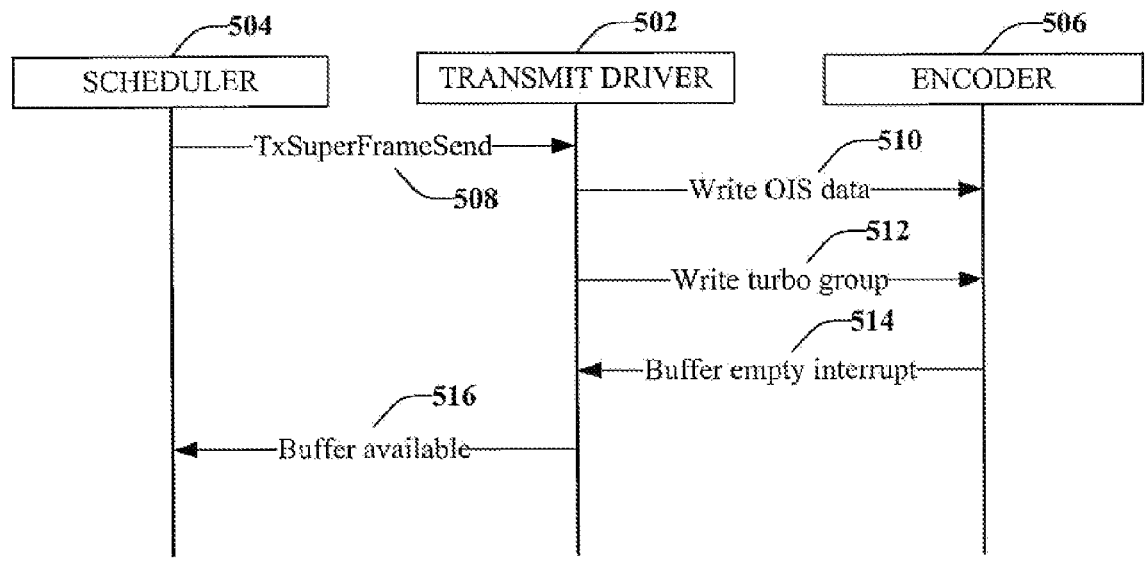
FIG. 5 is a flow diagram representing interactions to send a super frame according to one or more aspect disclosed herein.

FIG. 5 is a flow diagram 500 representing interactionsx to send a super frame according to one or more aspect disclosed herein. Transmit driver 502 provides an interface between a scheduler 504 and a turbo encoder 506. Scheduler 504 invokes a TxSuperFrameSend 508 to send a super frame of data to transmit driver 502. Scheduler 504 can provide the media to transmit driver 502 one super frame at a time by invoking the TxSuperFrameSend function call 508. Scheduler 504 can provide the LOI data, the WOI data, and a list of LCs that will be transmitted during that super frame. Transmit driver 502 writes OIS data 510 to the hardware or turbo encoder 506. Transmit driver 502 also writes one or more turbo groups 512 to turbo encoder 506. For example, transmit driver 502 can write LC 1 frame 1 turbo group 1, at 512. Transmit driver 502 waits to receive a signal from turbo encoder 506 indicating that its buffer is empty 514. Transmit driver 502 can double buffer the super frames and can continue writing turbo groups until the super frame has been consumed or processed. When a super frame has been processed, transmit driver 502 notifies scheduler 504 that it is ready for the next super frame by indicating that the buffer is available 516.

Figure 6:
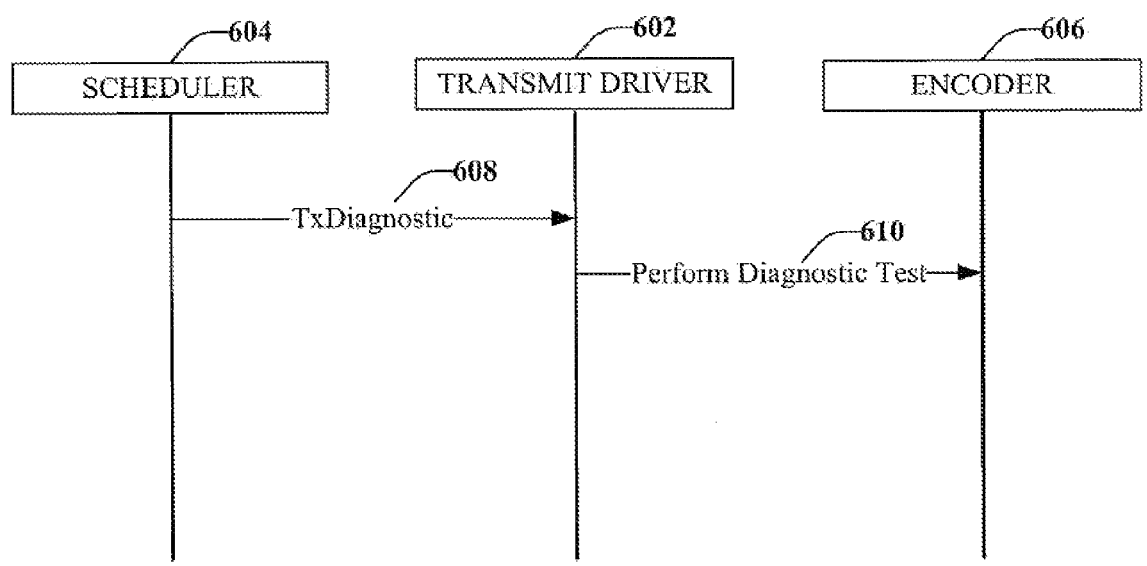
FIG. 6 is a flow diagram representing a diagnostic sequence in accordance with the disclosed aspects.

FIG. 6 is a flow diagram 600 representing a diagnostic sequence in accordance with the disclosed aspects. Periodically, automatically, or manually, a diagnotic test can be performed to ensure that system components are operating correctly. To invoke a diagnostic sequence, scheduler 604 sends a TxDiagnostic function call to transmit driver 602 to initiate a diagnostic test. TxDiagnostic function call 608 can include the appropriate diagnostic data. Transmit driver 602 performs the diagnostic test 610 on the hardware or turbo encoder 606.

Figure 7:
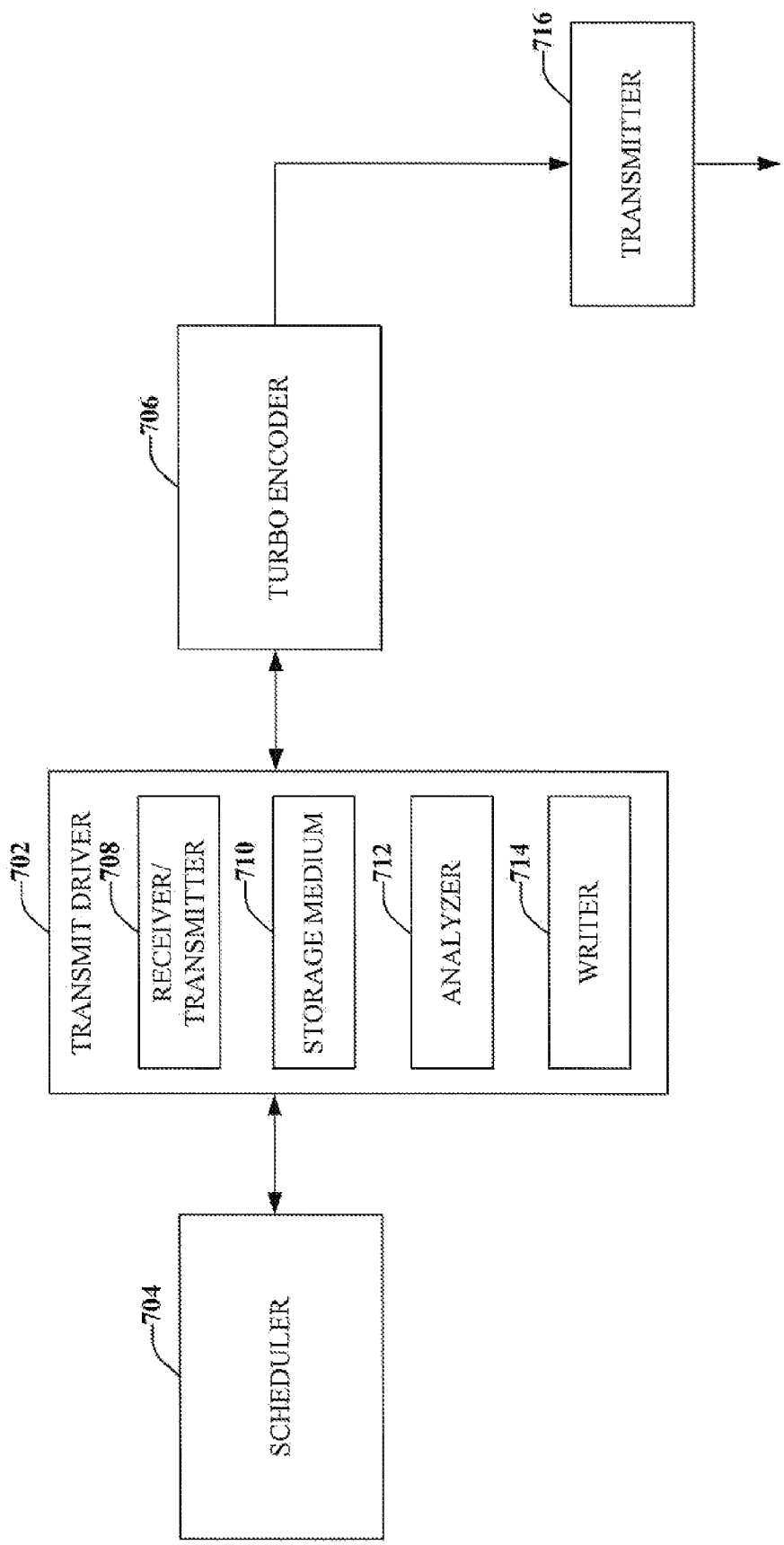
FIG. 7 is a system for data communication that utilizes a transmit driver.

FIG. 7 illustrates a data transmission system 700. System 700 includes a transmit driver 702, a scheduler or transmit client 704, and a turbo encoder 706. Transmit driver 702 can provide an interface between scheduler 704 and turbo encoder 706. The system components 702, 704, and 706 can reside on a computer, for example. To perform its various functionalities, transmit driver 702 can include a receiver/transmitter 708, a storage medium 710, an analyzer 712, and a writer 714.

Receiver/transmitter 78 can be configured to receive a function call from scheduler to initiate an open sequence to allocate transmit driver 702, a close sequence to deallocate transmit driver 702, a call to send a super frame of data, and/or to perform a diagnostic test. Receiver/transmitter 708 can further write data to turbo encoder 706, wherein such data to be written relates to the function call received from scheduler 704. Information from turbo encoder 706 can be sent to a transmitter 716 for subsequent processing and output for over the air (e.g., wireless) transmission. Receiver 708 can further receive a request for a super frame from turbo encoder 706.

Storage medium 710 can be figured to maintain or store a listing of turbo groups and can further sort such turbo groups according to their start symbol as well as other suitable information related to a data transmission system 700. Alternatively, this function can be performed by a processor (not shown) associated with transmit driver 702. Storage medium 710 can be, for example, a memory operatively coupled to transmitter driver 702. It should be appreciated that the data store (e.g., memories, storage medium(s)) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Storage medium 710 of the disclosed aspects are intended to comprise, without being limited to, these and other suitable types of memory.

When a request from turbo encoder 706 is received by receiver 708 indicating that turbo encoder 706 can accept another super frame, analyzer 712 can analyze or make a determination, by accessing the storage medium 710, for example, whether it has enough data to start another super frame. If the data is available, driver 702, through writer 714, writes the super frame to the appropriate hardware register(s) on turbo encoder 706. Turbo encoder 706 can indicate the availability of ping-pong buffers for up to about seven unique LCs. Transmit driver 702 can transverse the sorted list of LCs and write the first turbo group for up to seven LCs found in the list, for example. For each turbo group, the appropriate control information (e.g., start symbol, start slot, height, encoding mode . . . ) can be written. This process of checking for buffer availability and writing turbo groups can be repeated until the super frame is completed or processed.

According to some aspects, non-direct memory access (non-DMA) hardware component can be utilized. The hardware can notify transmit driver 702 of buffer availability through an interrupt. Processing of the interrupt can include transferring the next turbo group of LC, if any, for the given frame. If the LC for the given frame has completed, the next LC for the given frame can be selected from the sorted list of LCs that are maintained in storage medium 710. When an entire frame has been processed, the next frame can be started and a similar process is followed to complete the next or subsequent frame(s). When an entire super frame has been processed, the next super frame can be started and a similar process followed.

In some aspects, hardware support DMA over a PCI bus. In such aspects, the hardware can be programmed to read all turbo groups up to around seven LCs for a given frame. The hardware can notify transmit driver 702 through an interrupt when the LC for a given frame has been consumed. The next LC for the given frame can be selected from the sorted list of LCs and the DMA transfer can be initiated. When an entire frame has been processed, the next frame can be started and can follow a similar process. When an entire super frame has been processed, the next super frame can be started and follow a substantially similar process. In some aspects, transmit driver 702 may copy the turbo groups into a temporary buffer so that all turbo groups in a particular frame that are associated with a given LC are in contiguous memory.

Figure 8:
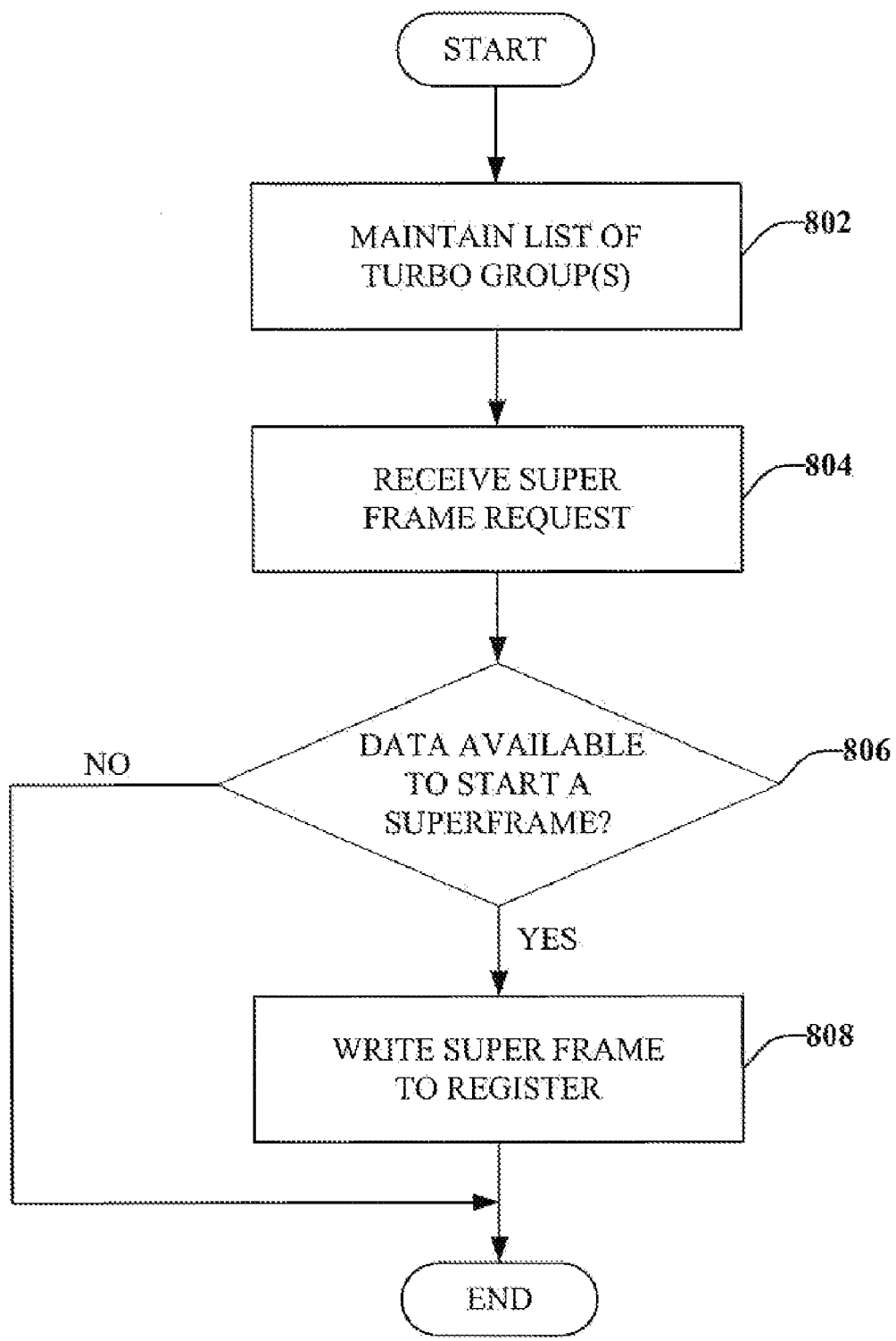
FIG. 8 is a methodology for data communication in accordance with the aspects disclosed herein.

In view of the exemplary systems shown and described above, methodologies, which may be implemented in accordance with one or more aspects of the various aspects, will be better appreciated with reference to the diagram of FIG. 8. While, for purposes of simplicity of explanation, the methodology is shown and described as a series of function blocks, it is to be understood and appreciated that the methodology is not limited by the order of blocks, as some blocks may, in accordance with these methodologies, occur in different orders and/or concurrently with other blocks from that shown and described herein. Moreover, not all illustrated blocks may be required to implement a methodology in accordance with one or more aspects of the disclosed aspects. It is to be appreciated that the various blocks may be implemented by software, hardware, a combination thereof or any other suitable means (e.g., device, system, process, and component) for carrying out the functionality associated with the blocks. It is also to be appreciated that the blocks are merely to illustrate certain aspects presented herein in a simplified form and that these aspects may be illustrated by a lesser and/or greater number of blocks. Moreover, not all illustrated blocks may be required to implement the following methodologies. Those skilled in the art will understand and appreciate that a methodology could alternatively be represented as a series of interrelated states or events, such as in a state diagram.

FIG. 8 is a methodology 800 for data communication in accordance with the aspects disclosed herein. Method begins at 802, where a list of turbo group(s) is maintained. These turbo groups can be maintained or stored in a memory or other storage medium and should be retrievable upon demand. The turbo group can include four turbo packets and a logical channel (LC) that includes sixteen turbo packets divided into groups of four turbo packets. At 804, a super frame request is received. This request can be received from, for example, a turbo encoder for subsequent processing and over the air (e.g., wireless) transmission.

A determination is made, at 806, whether there is data available to start a super frame in response to the request received, at 804. Such a determination can be made based on information stored in a storage medium associated with transmit driver. If there is not enough information available ("NO"), the method 800 ends. If the determination is that there is enough information available ("YES"), the super frame is written to an appropriate hardware register(s), at 808. It should be understood that a subsequent frame can be processed utilizing a similar methodology.

Non-DMA hardware can request a super frame by notifying the driver of buffer availability through an interrupt. Processing of the interrupt can include transferring the next turbo group of an LC (if any) for the given frame. For hardware supporting DMA, to request a super frame, the hardware can notify the driver through an interrupt when an LC for a given frame has been consumed. From the sorted list of LCs, the next turbo group of LC for the frame is selected. Thus, the interrupt can be selectively processing depending on whether the hardware component is a direct memory access hardware component or a non-direct memory access hardware component.

Figure 9:
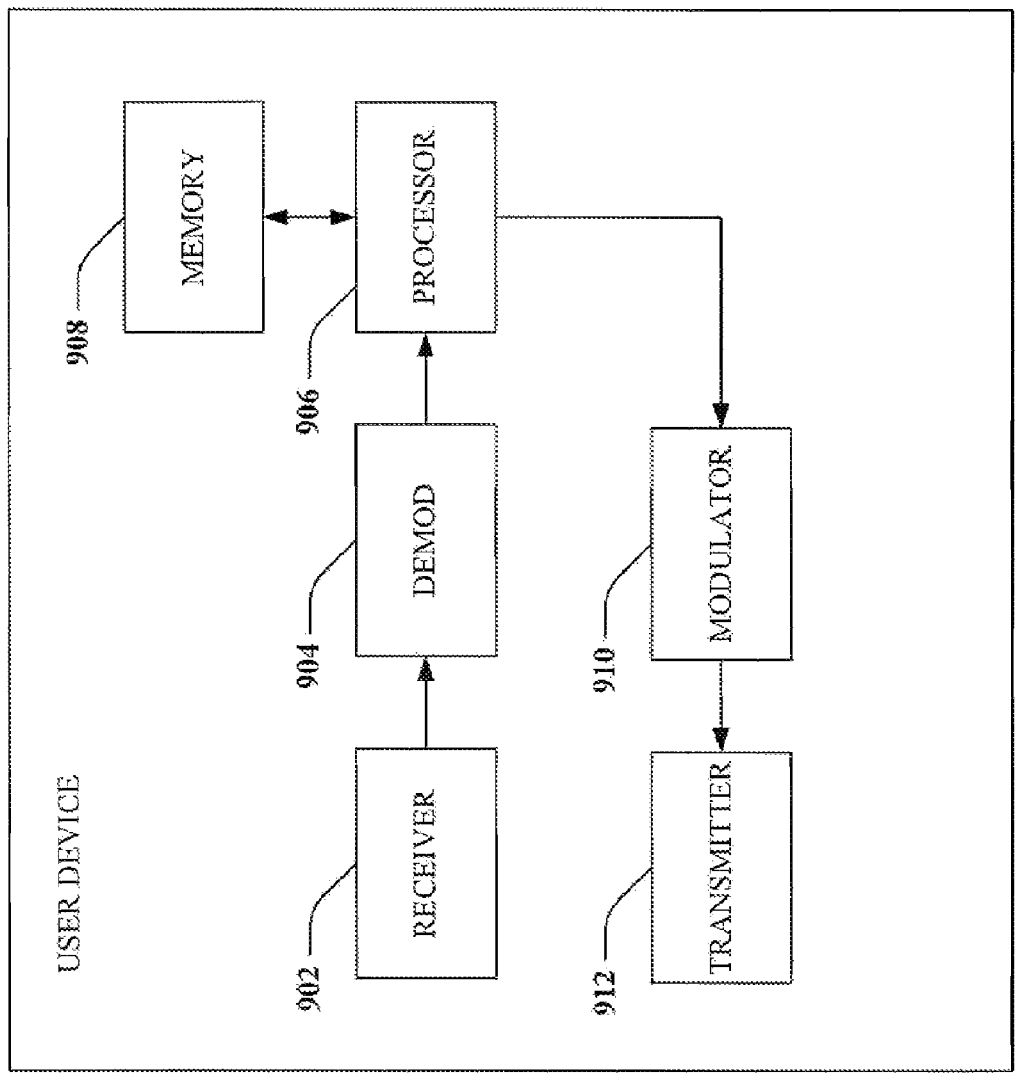
FIG. 9 illustrates a system that facilitates data communication between a transmit driver and a user device in a wireless communication environment in accordance with one or more of the disclosed aspects.

With reference to FIG. 9, illustrated is a system 900 that facilitates data communication between a transmit driver and a user device in a wireless communication environment in accordance with one or more of the disclosed aspects. System 900 can reside in an access point and/or in a user device. System 900 comprises a receiver 902 that can receive a signal from, for example, a receiver antenna. The receiver 902 can perform typical actions thereon, such as filtering, amplifying, downconverting, etc. the received signal. The receiver 902 can also digitizes the conditional signal to obtain samples. A demodulater 904 can obtain received symbols for each symbol period, as well as provide received symbols to a processor 906.

Processor 906 can be a processor dedicated to analyzing information received by receiver component 902 and/or generating information for transmission by a transmitter 916. Processor 906 control one or more components of user device 900, and/or processor 906 that analyzes information received by receiver 902, generates information for transmission by transmitter 916 and controls one or more components of user device 900. Processor 906 may include a controller component capable of coordinating communications with additional user devices.

User device 900 can additionally comprise memory 908 that is operatively coupled to processor 906 and that stores information related to coordinating communications and any other suitable information. Memory 908 can additionally store protocols associated with coordinating communication. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 908 of the subject systems and/or methods is intended to comprise, without being limited to, these and any other suitable types of memory. User device 900 still further comprises a symbol modulator 910 and a transmitter 912 that transmits the modulated signal.

Figure 10:
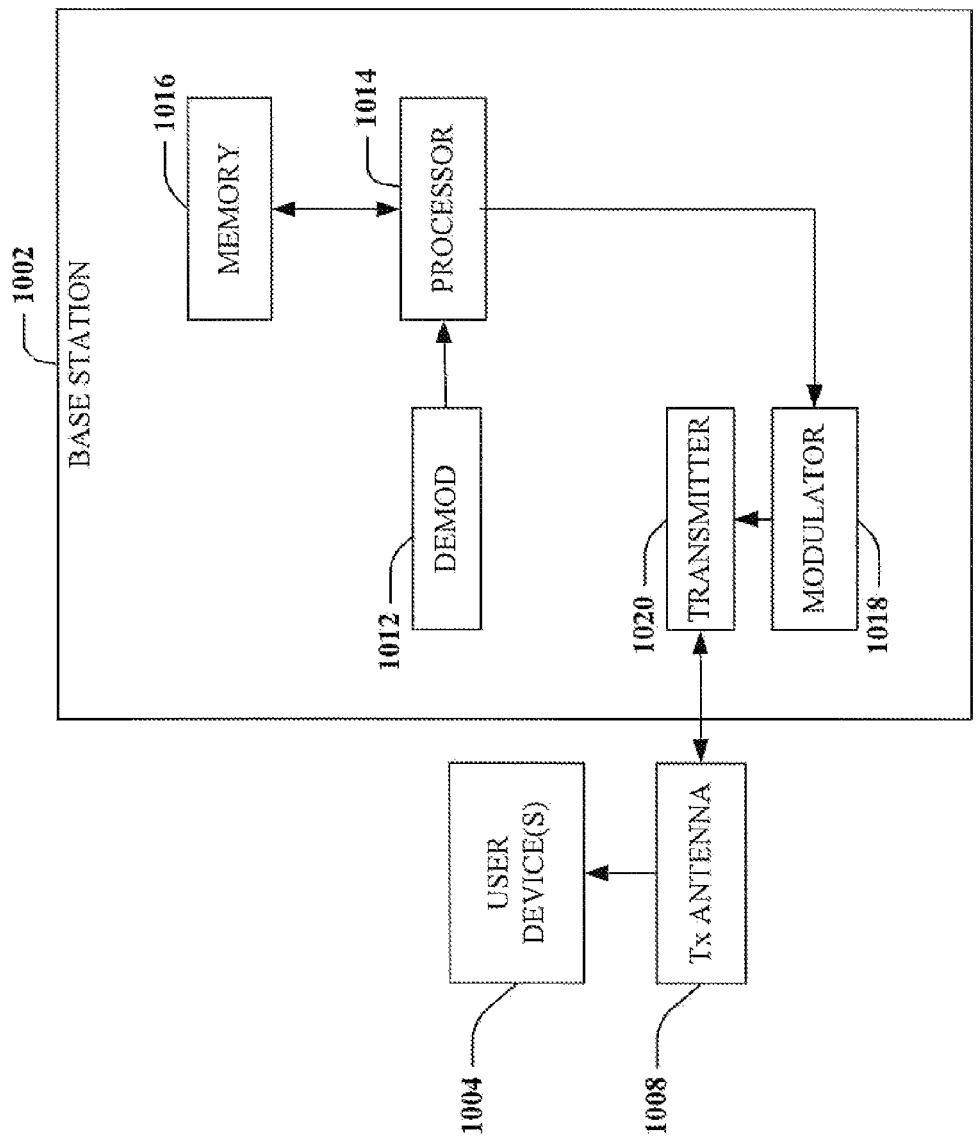
FIG. 10 illustrates a system that coordinates communication in a wireless communication environment in accordance with various aspects.

FIG. 10 is an illustration of a system 1000 that facilitates coordination of communication protocols in accordance with various aspects. System 1000 comprises a base station or access point 1002. As illustrated, base station transmits to the one or more user devices 1004 through a transmit antenna 1008.

Base station 1002 comprises a demodulator 1012 that demodulates received information. Demodulated symbols are analyzed by a processor 1014 that is coupled to a memory 1016 that stores information related to code clusters, user device assignments, lookup tables related thereto, unique scrambling sequences, and the like. A modulator 1018 can multiplex the signal for transmission by a transmitter 1020 through transmit antenna 1008 to user devices 1004.

Figure 11:
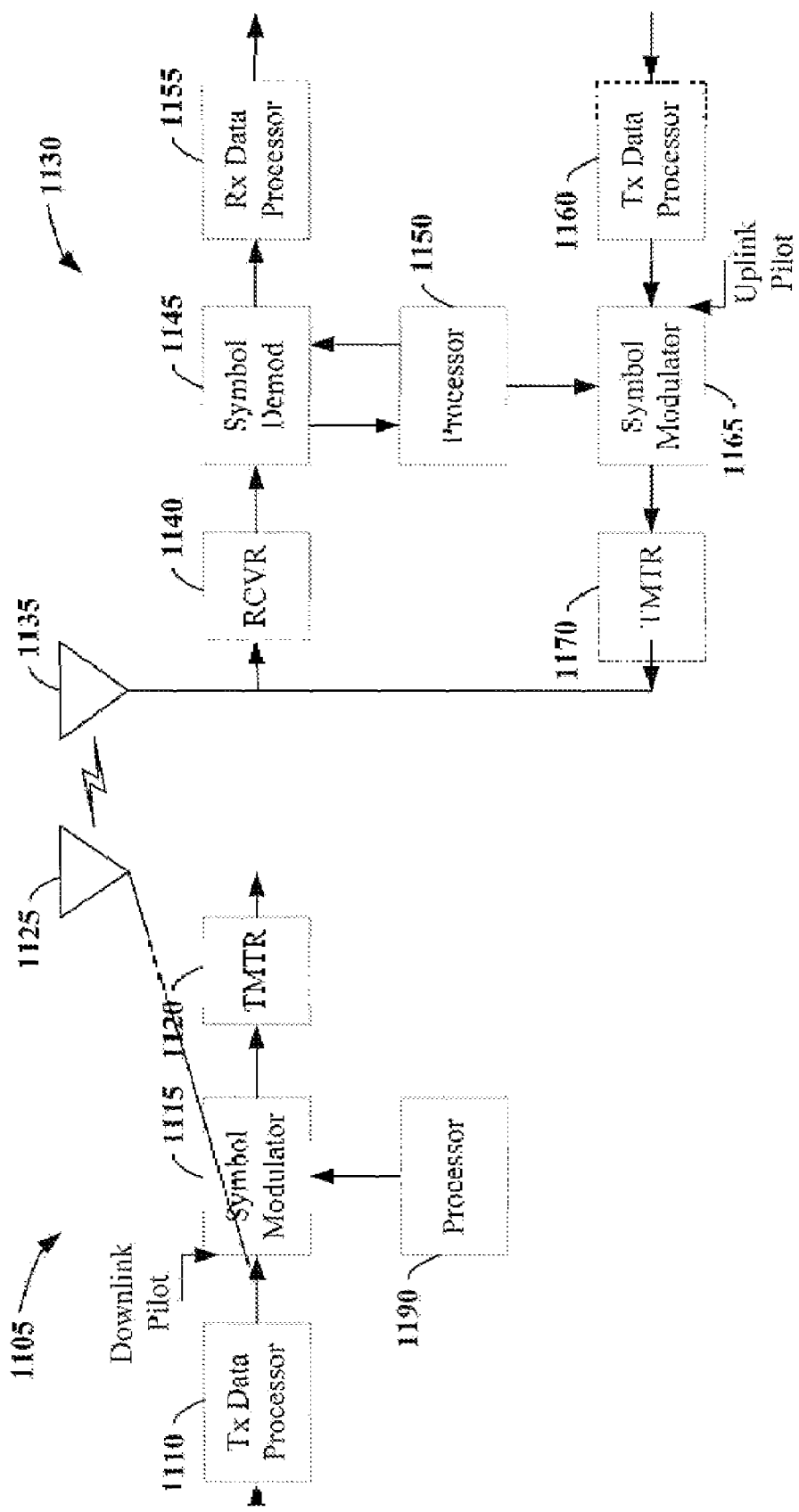
FIG. 11 illustrates a wireless communication environment that can be employed in conjunction with the various systems and methods described herein.

FIG. 11 illustrates an exemplary wireless communication system 1100. Wireless communication system 1100 depicts one base station and one terminal for sake of brevity. However, it is to be appreciated that system 1100 can include more than one base station or access point and/or more than one terminal or user device, wherein additional base stations and/or terminals can be substantially similar or different for the exemplary base station and terminal described below. In addition, it is to be appreciated that the base station and/or the terminal can employ the systems and/or methods described herein to facilitate wireless communication there between.

Referring now to FIG. 11, on a downlink, at access point 1105, a transmit (TX) data processor 1110 receives, formats, codes, interleaves, and modulates (or symbol maps) traffic data and provides modulation symbols ("data symbols"). A symbol modulator 1115 receives and processes the data symbols and pilot symbols and provides a stream of symbols. A symbol modulator 1115 multiplexes data and pilot symbols and obtains a set of N transmit symbols. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

A transmitter unit (TMTR) 1120 receives and converts the stream of symbols into one or more analog signals and further conditions (e.g., amplifies, filters, and frequency upconverts) the analog signals to generate a downlink signal suitable for transmission over the wireless channel. The downlink signal is then transmitted through an antenna 1125 to the terminals. At terminal 1130, an antenna 1135 receives the downlink signal and provides a received signal to a receiver unit (RCVR) 1140. Receiver unit 1140 conditions (e.g., filters, amplifies, and frequency downconverts) the received signal and digitizes the conditioned signal to obtain samples. A symbol demodulator 1145 obtains N received symbols and provides received pilot symbols to a processor 1150 for channel estimation. Symbol demodulator 1145 further receives a frequency response estimate for the downlink from processor 1150, performs data demodulation on the received data symbols to obtain data symbol estimates (which are estimates of the transmitted data symbols), and provides the data symbol estimates to an RX data processor 1155, which demodulates (i.e., symbol demaps), deinterleaves, and decodes the data symbol estimates to recover the transmitted traffic data. The processing by symbol demodulator 1145 and RX data processor 1155 is complementary to the processing by symbol modulator 1115 and TX data processor 1110, respectively, at access point 1105.

On the uplink, a TX data processor 1160 processes traffic data and provides data symbols. A symbol modulator 1165 receives and multiplexes the data symbols with pilot symbols, performs modulation, and provides a stream of symbols. A transmitter unit 1170 then receives and processes the stream of symbols to generate an uplink signal, which is transmitted by the antenna 1135 to the access point 1105.

Processors 1190 and 1150 direct (e.g., control, coordinate, manage, etc.) operation at access point 1105 and terminal 1130, respectively. Respective processors 1190 and 1150 can be associated with memory units (not shown) that store program codes and data. Processors 1190 and 1150 can also perform computations to derive frequency and impulse response estimates for downlink.

For a multiple-access system (e.g., FDMA, OFDMA, CDMA, TDMA, etc.), multiple terminals can transmit concurrently on the uplink. For such a system, the pilot subbands may be shared among different terminals. The channel estimation techniques may be used in cases where the pilot subbands for each terminal span the entire operating band (possibly except for the band edges). Such a pilot subband structure would be desirable to obtain frequency diversity for each terminal. The techniques described herein may be implemented by various means. For example, these techniques may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1190 and 1150.

Figure 12:
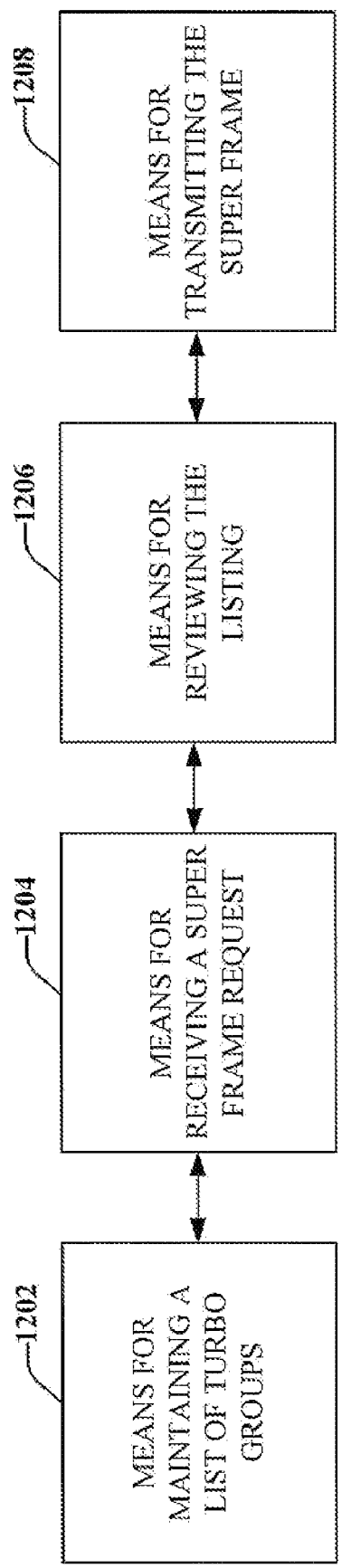
FIG. 12 illustrates a data communication system in accordance with the various aspects.

With reference now to FIG. 12, illustrated is a data communication system 1200. System includes a means for maintaining a list of turbo groups 1202, wherein a turbo group comprises four turbo packets and a logical channel (LC) that includes at least four groups of four turbo packets. The means for maintaining a list of turbo groups 1202 interfaces with a means for receiving a super frame request 1204. The super frame request can be received from a direct memory access hardware component or a non-direct memory access hardware component. Upon receipt of the request, a means for reviewing the maintained list 1206 access the maintained list and makes a determination whether there is data is available to complete the request. If there is enough data available, a means for transmitting the super frame 1208 communicates or transmits the super frame to a register(s) associated with the hardware component that sent the request.

Figures 13, 14:
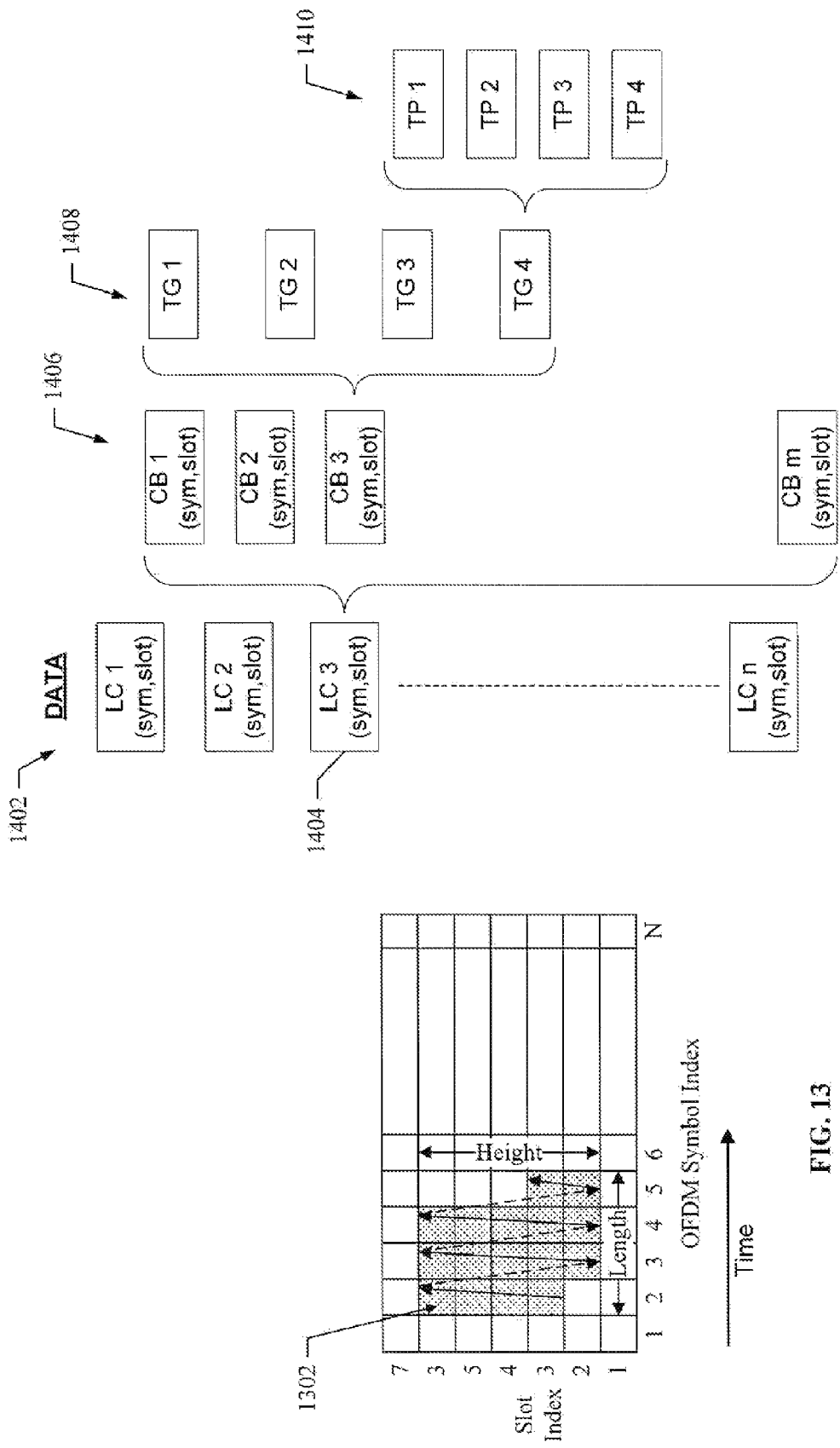
FIG. 13 shows a super frame suitable for processing by aspects of a transmit driver.
FIG. 14 shows a diagram illustrating a super frame comprising a plurality of logical channels.

FIG. 13 shows a data frame 1300 suitable for processing by aspects of a transmit driver. For example, the data frame 1300 may be processed by the transmit driver 102 shown in FIG. 1. The data frame 1300 comprises data in a matrix of "N" OFDM symbols by seven slots. Each symbol-slot intersect defines a data slot. Data comprising a logical channel 1302 is shown packed into the data frame 1300. The logical channel 1302 comprises a plurality of code blocks of data and its location in the data frame is defined by a height in slots and a length in symbols. It should be noted that the data frame 1300 may comprise a large number of logical channels and each of the logical channels may be packed into the data frame 1300 using any suitable height and length parameters. In an aspect, a super frame is defined that comprises four data frames.

FIG. 14 shows a diagram illustrating a super frame 1400 comprising a plurality of logical channels. For example, the super frame 1400 comprises "n" logical channels as shown at 1402. For each logical channel, there is a plurality of code blocks (CB). For example, the LC 1404 comprises "m" code blocks as shown at 1406. Each code block comprises four turbo groups as shown at 1408, and each turbo group comprises four turbo packets as shown at 1410. Furthermore, each code block 1406 comprises a symbol (sym) index and a slot (slot) index that indicate the location of a code block in the super frame. In an aspect, the transmit driver operates to organize all the turbo groups from all the code blocks into a list of time-sequenced turbo groups based on the symbol and slot index values of their associated code blocks. This allows the turbo groups be time-sequenced so that the turbo groups occurring earlier in the frame are output before turbo group occurring later in the frame. A more detailed description of organization of the turbo groups by the transmit driver is provided in another section of this document.

Figure 15:
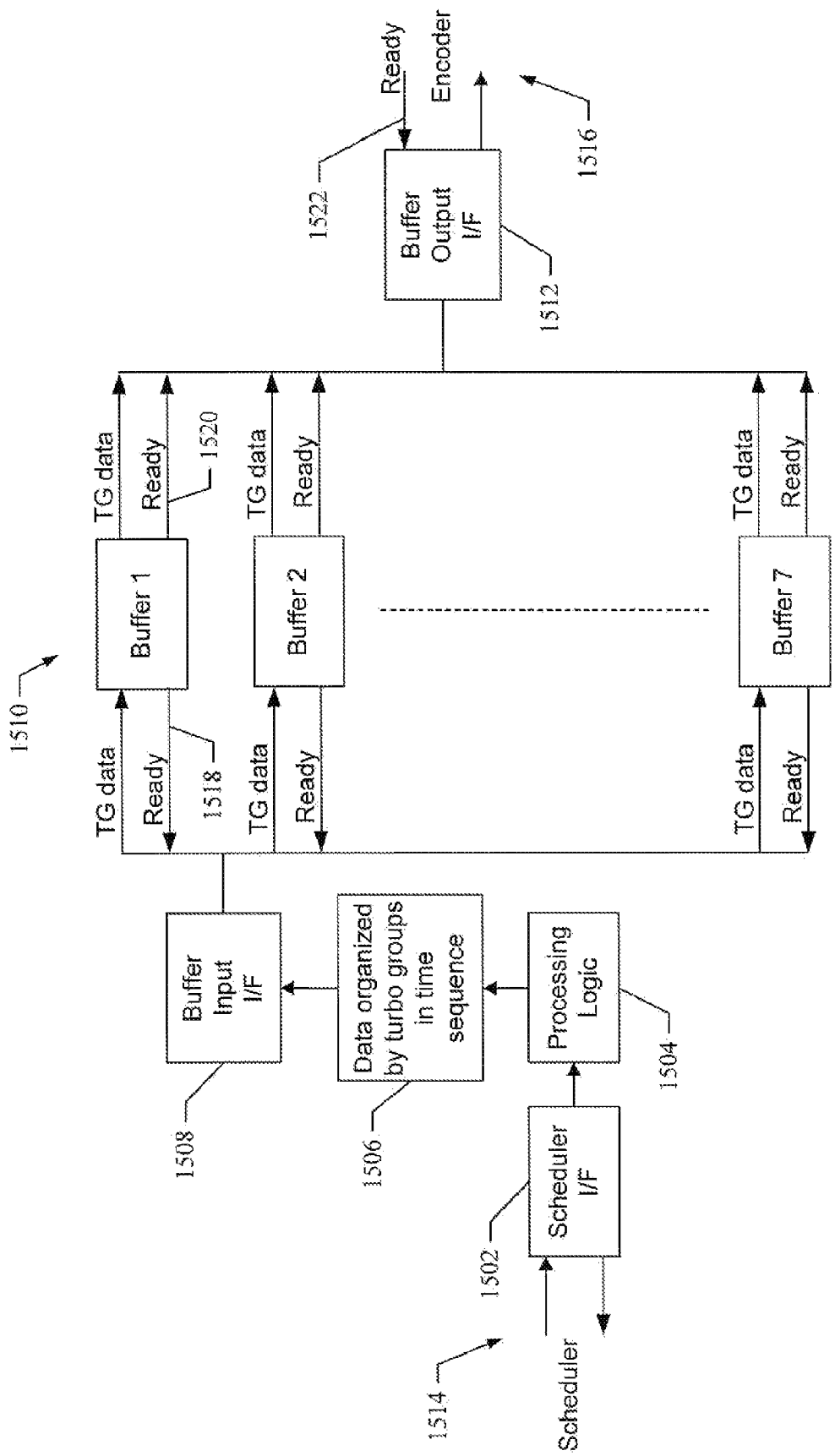
FIG. 15 shows an aspect of a transmit driver.

FIG. 15 shows an aspect of a transmit driver 1500. For example, the transmit driver 1500 is suitable for use at the transmit driver 102 shown in FIG. 1. The transmit driver 1500 comprises a scheduler interface (I/F) 1502, processing logic 1504, a memory 1506, buffer input logic 1508, buffers 1510, and buffer output logic 1512.

The scheduler I/F 1502 comprises a CPU, processor, gate array, hardware logic, memory elements, virtual machine, software, and/or any combination of hardware and software. The scheduler I/F 1502 provides interface signals 1514 that allows the transmit driver 1500 to communicate with a data scheduler to received data for transmission. For example, the scheduler I/F 1502 communicates with the scheduler 104 shown in FIG. 1 in accordance with the interface specifications described above (i.e., FIGS. 3-6) to receive super frames for transmission. The scheduler I/F 1502 operates to pass the received super frames to the processing logic 1504.

The processing logic 1504 comprises a CPU, processor, gate array, hardware logic, memory elements, virtual machine, software, and/or any combination of hardware and software. The processing logic 1504 operates to receive super frames from the scheduler I/F 1502 and organize the data by turbo groups into a time-sequenced list of turbo groups that is stored in memory 1506.

The memory 1506 comprises RAM, Flash memory, EEPROM, hard disk, and/or any other type of suitable storage device operable to store time-sequenced turbo groups provided by the processing logic 1504.

The buffers 1510 comprise any suitable memory and/or logic operable to store and access turbo groups. In an aspect, the buffers 1510 comprise RAM, flash memory, and/or any other suitable type of memory component. In an aspect, the buffers 1510 comprise seven buffers that can store turbo group data, however, in other aspects, more or fewer buffers may be used.

The buffer input logic 1508 comprises a CPU, processor, gate array, hardware logic, memory elements, virtual machine, software, and/or any combination of hardware and software. The buffer input logic 1508 operates to retrieves turbo group data from the time-sequence list of turbo groups stored in the memory 1506 and write the retrieved turbo groups into a selected buffer of the buffers 1510. For example, each of the buffers 1510 provides a buffer ready signal 1518 that indicates that a particular buffer is ready to accept data. The buffer input logic 1508 operates to receive the buffer ready signals 1518 and write a turbo group into a particular buffer when a ready signal from that buffer is received. For example, when a buffer is ready, the buffer input logic 1508 operates to retrieve the next turbo group from the time-sequenced list stored in the memory 1506 and write that turbo group into the available buffer.

The buffer output logic 1512 comprises a CPU, processor, gate array, hardware logic, memory elements, virtual machine, software, and/or any combination of hardware and software. The buffer output logic 1512 operates to retrieve turbo group data stored in the buffers 1510 and output the retrieved turbo group data to an encoder. For example, each of the buffers 1510 provides a buffer ready signal 1520 that indicates that a particular buffer is ready to output data. The buffer output logic 1512 operates to receive the buffer ready signals 1520 and retrieve a turbo group from a particular buffer when a ready signal from that buffer is received. The retrieved turbo group is then output to the encoder using encoder interface signals 1516. For example, the encoder provides an encoder ready signal 1522 that indicates that the encoder is ready to accept one or more turbo groups of data. When the buffer output interface 1512 receives the encoder ready signal 1522, it operates to output one or more turbo groups of data that have been retrieved from the buffers 1510.

During operation, the transmit driver logic 1500 operates to receive data from a scheduler. For example, the data comprises a super frame having logical channels where each channel has one or more code blocks, and each code block has four turbo groups. The scheduler I/F 1502 operates to receive the data and passes the data to the processing logic 1504 for processing. The processing logic 1504 operates to organize the data into time-sequenced turbo groups that are stored in the memory 1506. The buffer input logic 1508 operates to write the time-sequenced turbo group data into the buffers 1510 based on the ready signals 1518. The buffer output logic 1512 operates to retrieve the time-sequenced turbo group data from the buffers 1510 based on the ready signals 1520. The retrieved turbo group data is then output to an encoder using the encoder interface signals 1516. As a result, the time-sequenced turbo groups are output in the same time sequence that was organized by the processing logic 1504. Thus, the transmit driver 1500 operates to efficiently organize and transmit data to an encoder so that the data can be encoded for transmission over a communication network.

In an aspect, the functions of the transmit driver 1500 are embodied in one or more program instructions ("program instructions") stored on a computer-readable media, which when executed by at least one processor, provides the functions described herein. For example, the program instructions may be stored a computer-readable media, such as a floppy disk, CDROM, memory card, FLASH memory device, RAM, ROM, or any other type of memory device or computer-readable medium. In another aspect, the instructions may be downloaded from an external device or network resource. The program instructions, when executed by at least one processor, provide the functions of the transmit driver 1500 as described herein.

It should be noted that the transmit driver 1500 is just one implementation and that other implementations are possible within the various aspects. For example, the transmit driver 1500 may be implemented entirely using a CPU, processor, gate array, hardware logic, memory elements, virtual machine, software, and/or any combination of hardware and software.

Figure 16:
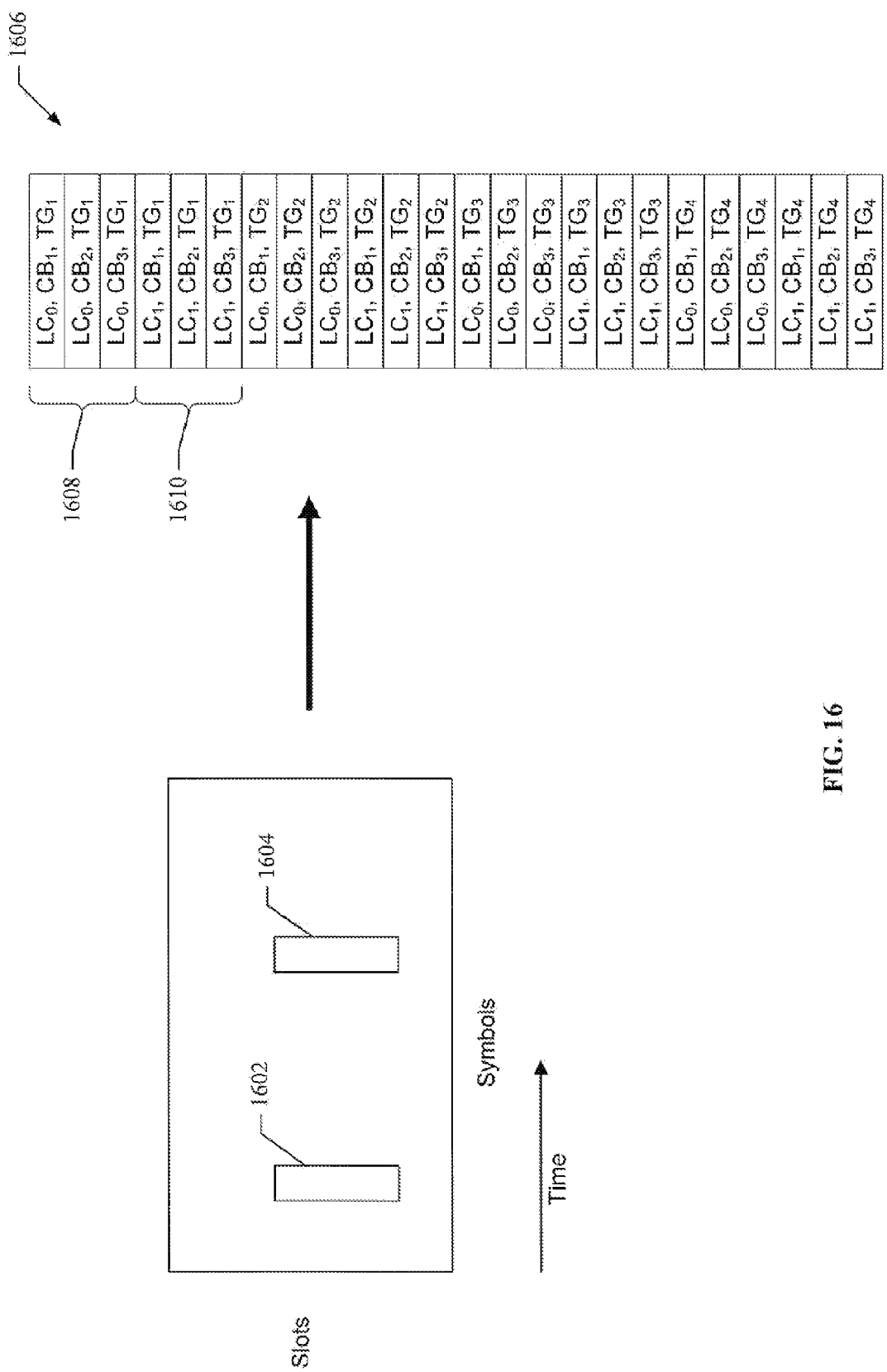
FIG. 16 illustrates how turbo groups of a super frame are organized as time-sequenced turbo groups by an aspect of a transmit driver.

FIG. 16 illustrates how turbo groups of a super frame are organized as time-sequenced turbo groups by an aspect of a transmit driver. A super frame 1600 comprises data organized in a matrix of symbols and slots. A first logical channel ($LC_0$) is shown at 1602 and a second logical channel ($LC_1$) is shown at 1604. For the purpose of this description, it will be assumed that each of the logical channels 1602, 1604 comprise three code blocks and that each code block comprises four turbo groups. It should be noted that a logical channel may contain any number of code blocks and is not limited to just three code blocks.

In an aspect, the super frame is organized into time-sequenced turbo groups. For example, the processing logic 1504 operates to organize the super frame 1600 into the time-sequenced turbo groups and stores them into the memory 1506.

Time-sequenced turbo groups are shown at 1606. For example, the time-sequenced turbo groups 1606 are generated by the processing logic 1504. The time-sequenced turbo groups 1606 comprise turbo groups that are grouped based on their associated logical channel and code block locations in the super frame 1600. For example, the logical channel 1602 occurs in time before the logical channel 1604 in the super frame 1600. In an aspect, the symbol index and slot index associated with each code block is used to determine the time location for each turbo group.

Furthermore, for transmission purposes, the super frame is partitioned into four frames where the first frame contains turbo group 1 data, the second frame contains turbo group 2 data, the third frame contains turbo group 3 data, and the fourth frame contains turbo group 4 data. As a result, the processing logic 1504 operates to organize the turbo groups of the super frame 1600 so that turbo group 1 data for all logical channels occurs before turbo group 2 data for all logical channels, and so on. For example, the first turbo groups of the three code blocks of the logical channel 1602 are shown at 1608. This group is followed by the first turbo groups of the three code blocks of the logical channel 1604 as shown at 1610. The list continues with the second turbo groups for each logical channel followed by the third and fourth turbo groups. Thus, the transmit driver operates to organize a super frame into time-sequenced turbo groups based on their associated logical channels and code blocks.

Figure 17:
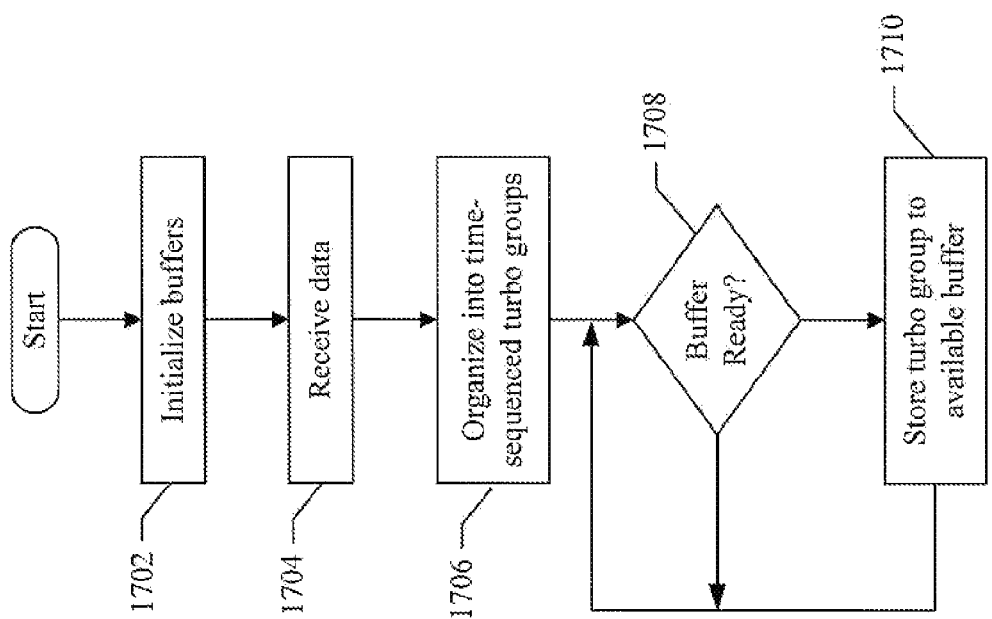
FIG. 17 shows a method for providing an aspect of a transmit driver.

FIG. 17 shows a method 1700 for providing an aspect of a transmit driver. In an aspect, the method 1700 is provided by the transmit driver 1500 shown in FIG. 15.

At block 1702, buffers are initialized. For example, the buffers 1510 are initialized so that they are ready to accept turbo group data.

At block 1704, a super frame is received. For example, the super frame is received from a scheduler, such as the scheduler 104 shown in FIG. 1. In an aspect, the super frame is received by the scheduler I/F 1502 and the received super frame is passed to the processing logic 1504.

At block 1706, the super frame is organized into time-sequenced turbo groups. For example, the super frame is organized as illustrated by the time-sequenced turbo groups 1606 shown in FIG. 16. In an aspect, the processing logic 1504 operates to organize the turbo groups based on their associated logical channels and code blocks (i.e., using code block symbol and slot index values).

At block 1708, a test is performed to determine if there is a buffer ready to accept time-sequenced turbo group data. For example, the buffer input logic 1508 determines if there are any buffer ready signals 1518. If there is a buffer ready to receive turbo group data, the method proceeds to block 1710. If there is not a buffer ready to receive turbo group data, the method proceeds back to block 1708.

At block 1710, a turbo group is stored in an available buffer. For example, the buffer input logic 1508 determines that a buffer is ready and operates to retrieve the next turbo group from the time-sequenced turbo groups stored in the memory 1506 and stores that turbo group in the available buffer. The method then returns to block 1708 to determine the next available buffer.

Thus, the method 1700 operates to provide aspects of transmit driver. For example, the method 1700 operates to store turbo groups from a time-sequenced turbo groups into available buffers. The method 1800 described below operates to retrieve the turbo groups from the buffers and outputs them to an encoder to be encoded for transmission over a communication network. It should be noted that the method 1700 represents just one implementation and that other implementations are possible within the scope of the aspects.

Figure 18:
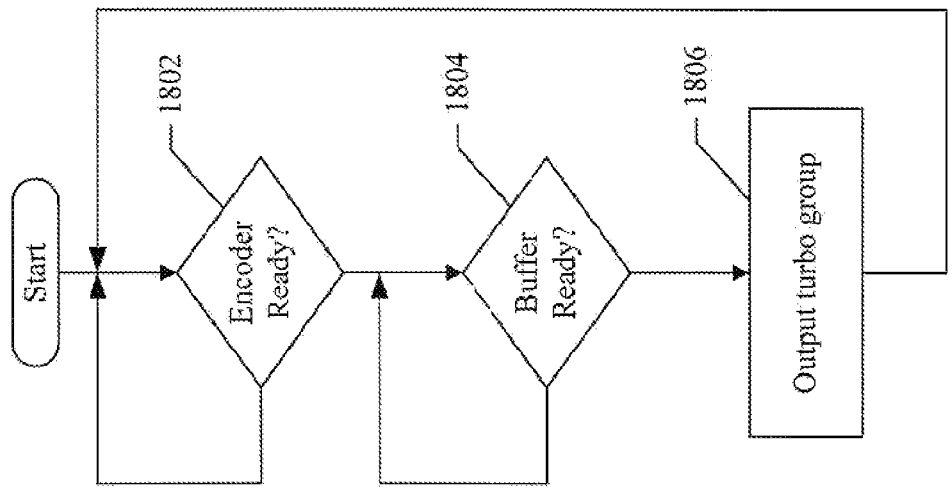
FIG. 18 shows a method for providing an aspect of a transmit driver.

FIG. 18 shows a method 1800 for providing an aspect of a transmit driver. In an aspect, the method 1800 is provided by the transmit driver 1500 shown in FIG. 15.

At block 1802, a test is performed to determine if an encoder is ready to receive turbo group data. For example, the buffer output logic 1512 operates to determine if the encoder ready signal 1522 indicates that the encoder is ready to accept turbo group data. If the encoder is ready, the method proceeds to block 1804. If the encoder is not ready, the method returns to block 1802.

At block 1804, a test is performed to determine if a buffer is ready to output turbo group data. For example, the buffer output logic 1512 operates to determine if one of the buffers 1510 is ready to output turbo group data by determining if the ready signal 1520 indicates that a buffer is ready. If a buffer is ready, the method proceeds to block 1806. If a buffer is not ready, the method returns to block 1804.

At block 1806, turbo group data is output to an encoder. For example, the buffer output logic 1512 operates to output turbo group data to an encoder using interface signals 1516. The turbo group data is output in the same time-sequenced order in which it was written into the buffers 1510. The method then proceeds to block 1802 to determine if the encoder is ready to accept more turbo group data.

Thus, the method 1800 operates to provide aspects of transmit driver. For example, the method 1800 operates to output turbo groups from storage buffers to an encoder for transmission over a data network. It should be noted that the method 1800 represents just one implementation and that other implementations are possible within the scope of the aspects.

Figure 19:
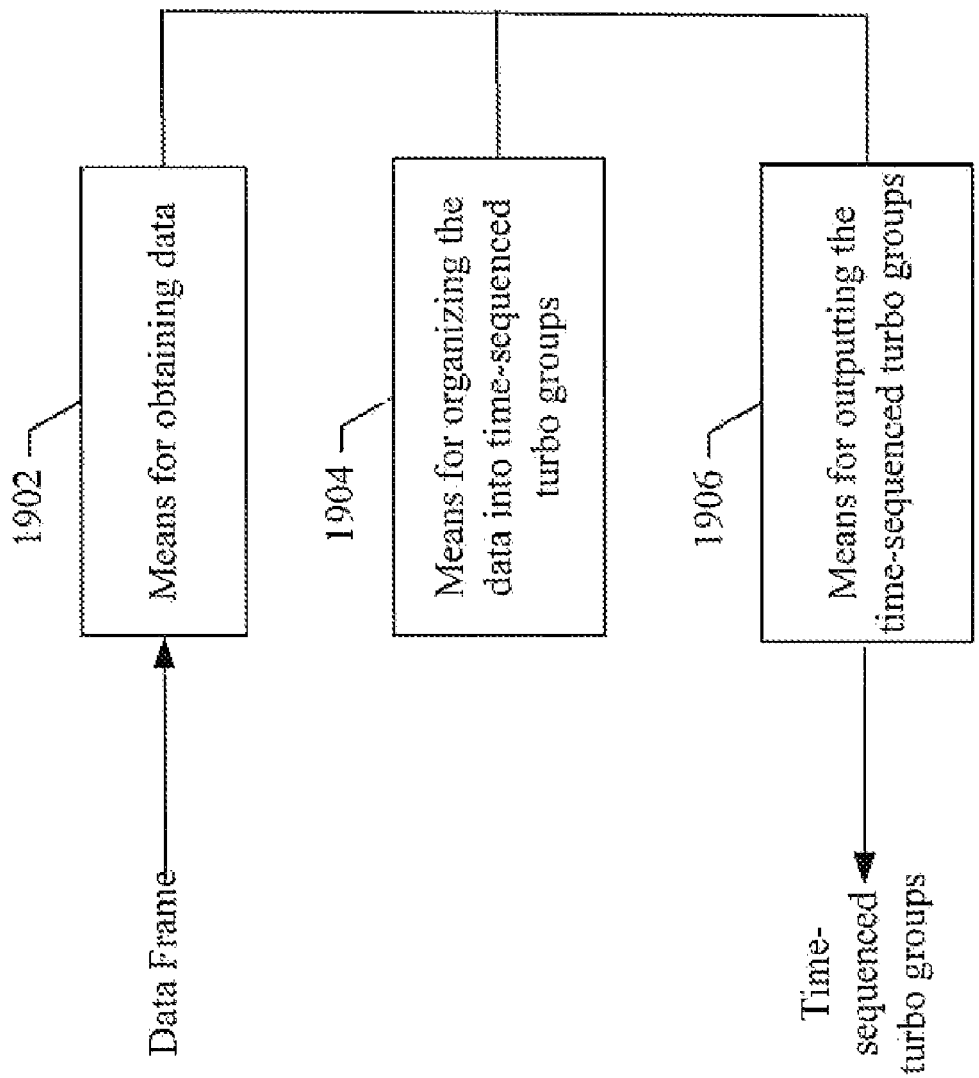
FIG. 19 shows an aspect of a transmit driver.

FIG. 19 shows an aspect of a transmit driver 1900. The transmit driver 1900 comprises means (1902) for obtaining data. For example, in an aspect, the means 1902 comprises the scheduler I/F 1502. The transmit driver 1900 also comprises means (1904) for organizing data into time-sequenced turbo groups. For example, in an aspect, the means 1904 comprises the processing logic 1504. The transmit driver 1900 also comprises means (1906) for outputting time-sequenced turbo groups. For example, in an aspect, the means 1906 comprises the buffers 1510 and the buffer output I/F 1512.

It is to be understood that the aspects described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for data transmission, the method comprising:
obtaining data comprising one or more logical channels wherein each of the logical channels comprises one or more code blocks, and wherein each of the code blocks comprises one or more turbo groups;
organizing the data based on the one or more code blocks to produce time-sequenced turbo groups; and
outputting the time-sequenced turbo groups.

2. The method of claim 1, wherein said obtaining comprises obtaining the data comprising the one or more code blocks wherein each of the one or more code blocks comprises four turbo groups.

3. The method of claim 2, further comprising organizing the data into four frames wherein one of the four turbo groups associated with each of the one or more code blocks is assigned to one of the four frames, respectively.

4. The method of claim 1, wherein said obtaining comprises obtaining the data comprising the one or more code blocks wherein each of the code blocks comprises a symbol index and a slot index.

5. The method of claim 4, wherein said organizing comprises organizing the one or more turbo groups associated with the one or more code blocks based on the symbol index and the slot index.

6. The method of claim 5, wherein said organizing comprises:
organizing the one or more turbo groups so that turbo groups associated with a lower slot index are time-sequenced before turbo groups associated with a higher slot index; and
organizing the one or more turbo groups so that turbo groups associated with a lower symbol index are time-sequenced before turbo groups associated with a higher slot index.

7. The method of claim 1, wherein said outputting comprises:
writing the time-sequenced turbo groups into one or more memory buffers based on one or more buffer ready signals; and
outputting the time-sequenced turbo groups from the one or more memory buffers based on one or more encoder ready signals.

8. The method of claim 1, further comprising maintaining a sorted list of turbo groups and analyzing the maintained list of turbo groups in order to determine if there is data available to begin a super frame.

9. An apparatus for data transmission, the apparatus comprising:
a processor configured to support input logic for obtaining data comprising one or more logical channels wherein each of the logical channels comprises one or more code blocks, and wherein each of the code blocks comprises one or more turbo groups;

a processor configured to support processing logic to organize the data based on the one or more code blocks to produce time-sequenced turbo groups; and a processor configured to support output logic to output the time-sequenced turbo groups.

10. The apparatus of claim 9, wherein each of the one or more code blocks comprises four turbo groups.

11. The apparatus of claim 10, said processing logic is configured to organize the data into four frames wherein one of the four turbo groups associated with each of the one or more code blocks is assigned to one of the four frames, respectively.

12. The apparatus of claim 9, wherein each of the code blocks comprises a symbol index and a slot index.

13. The apparatus of claim 12, wherein said processing logic is configured to organize the one or more turbo groups associated with the one or more code blocks based on the symbol index and the slot index.

14. The apparatus of claim 13, wherein said processing logic is configured to organize the one or more turbo groups so that turbo groups associated with a lower slot index are time-sequenced before turbo groups associated with a higher slot index, and to organize the one or more turbo groups so that turbo groups associated with a lower symbol index are time-sequenced before turbo groups associated with a higher symbol index.

15. The apparatus of claim 9, further comprising a processor configured to maintain a sorted list of turbo groups and analyze the maintained list of turbo groups in order to determine if there is data available to begin a super frame.

16. The apparatus of claim 9, wherein said outputting comprises:

writing the time-sequenced turbo groups into one or more memory buffers based on one or more buffer ready signals; and outputting the time-sequenced turbo groups from the one or more memory buffers based on one or more encoder ready signals.

17. An apparatus for data transmission, the apparatus comprising:

means for obtaining data comprising one or more logical channels wherein each of the logical channels comprises one or more code blocks, and wherein each of the code blocks comprises one or more turbo groups;

means for organizing the data based on the one or more code blocks to produce time-sequenced turbo groups; and means for outputting the time-sequenced turbo groups.

18. The apparatus of claim 17, wherein said means for obtaining comprises means for obtaining the data comprising the one or more code blocks wherein each of the one or more code blocks comprises four turbo groups.

19. The apparatus of claim 18, further comprising means for organizing the data into four frames wherein one of the four turbo groups associated with each of the one or more code blocks is assigned to one of the four frames, respectively.

20. The apparatus of claim 17, wherein said means for obtaining comprises means for obtaining the data comprising the one or more code blocks wherein each of the code blocks comprises a symbol index and a slot index.

21. The apparatus of claim 20, wherein said means for organizing comprises means for organizing the one or more turbo groups associated with the one or more code blocks based on the symbol index and the slot index.

22. The apparatus of claim 21, wherein said means for organizing comprises:

means for organizing the one or more turbo groups so that turbo groups associated with a lower slot index are time-sequenced before turbo groups associated with a higher slot index; and means for organizing the one or more turbo groups so that turbo groups associated with a lower symbol index are time-sequenced before turbo groups associated with a higher slot index.

23. The apparatus of claim 17, wherein said means for outputting comprises:

means for writing the time-sequenced turbo groups into one or more memory buffers based on one or more buffer ready signals; and means for outputting the time-sequenced turbo groups from the one or more memory buffers based on one or more encoder ready signals.

24. A computer-readable storage medium for storing computer executable instructions which is executable by at least one processor, and operable to provide a system for data transmission, the computer executable instructions comprising:

instructions for obtaining data comprising one or more logical channels wherein each of the logical channels comprises one or more code blocks, and wherein each of the code blocks comprises one or more turbo groups;

instructions for organizing the data based on the one or more code blocks to produce time-sequenced turbo groups; and instructions for outputting the time-sequenced turbo groups.

25. The computer readable storage medium of claim 24, wherein said instructions for obtaining the data comprising the one or more code blocks wherein each of the one or more code blocks comprising one or more turbo groups includes four turbo groups.

26. The computer-readable storage medium of claim 25, further comprising instructions for organizing the data into four frames wherein one of the four turbo groups associated with each of the one or more code blocks is assigned to one of the four frames, respectively.

27. The computer-readable storage medium of claim 24, wherein said instructions for obtaining comprise instructions for obtaining the data comprising the one or more code blocks wherein each of the code blocks comprises a symbol index and a slot index.

28. The computer-readable storage medium of claim 27, wherein said instructions for organizing comprise instructions for organizing the one or more turbo groups associated with the one or more code blocks based on the symbol index and the slot index.

29. The computer-readable storage medium of claim 28, wherein said instructions for organizing comprise:

instructions for organizing the one or more turbo groups so that turbo groups associated with a lower slot index are time-sequenced before turbo groups associated with a higher slot index; and instructions for organizing the one or more turbo groups so that turbo groups associated with a lower symbol index are time-sequenced before turbo groups associated with a higher slot index.

30. The computer-readable storage medium of claim 24, wherein said instructions for outputting comprise:

instructions for writing the time-sequenced turbo groups into one or more memory buffers based on one or more buffer ready signals; and instructions for outputting the time-sequenced turbo groups from the one or more memory buffers based on one or more encoder ready signals.

31. The apparatus of claim 17, further comprising means for maintaining a sorted list of turbo groups and analyzing the maintained list of turbo groups in order to determine if there is data available to begin a super frame.

32. At least one processor configured to perform a method for data transmission, the method comprising:
   obtaining, using a processor, data comprising one or more logical channels wherein each of the logical channels comprises one or more code blocks, and wherein each of the code blocks comprises one or more turbo groups;
   organizing, using a processor, the data based on the one or more code blocks to produce time-sequenced turbo groups; and
   outputting, using a processor, the time-sequenced turbo groups.

33. The method of claim 32, wherein said obtaining comprises obtaining the data comprising the one or more code blocks wherein each of the one or more code blocks comprises four turbo groups.

34. The method of claim 33, further comprising organizing the data into four frames wherein one of the four turbo groups associated with each of the one or more code blocks is assigned to one of the four frames, respectively.

35. The method of claim 32, wherein said obtaining comprises obtaining the data comprising the one or more code blocks wherein each of the code blocks comprises a symbol index and a slot index.

36. The method of claim 35, wherein said organizing comprises organizing the one or more turbo groups associated with the one or more code blocks based on the symbol index and the slot index.

37. The method of claim 36, wherein said organizing comprises:
   organizing the one or more turbo groups so that turbo groups associated with a lower slot index are time-sequenced before turbo groups associated with a higher slot index; and organizing the one or more turbo groups so that turbo groups associated with a lower symbol index are time-sequenced before turbo groups associated with a higher slot index.

38. The method of claim 32, wherein said outputting comprises:
   writing the time-sequenced turbo groups into one or more memory buffers based on one or more buffer ready signals; and
   outputting the time-sequenced turbo groups from the one or more memory buffers based on one or more encoder ready signals.

39. The computer readable storage medium of claim 24, further comprising instructions for maintaining a sorted list of turbo groups and analyzing the maintained list of turbo groups in order to determine if there is data available to begin a super frame.

40. The processor of claim 39, further configured to perform a method for maintaining a sorted list of turbo groups and analyzing the maintained list of turbo groups in order to determine if there is data available to begin a super frame.

* * * * *

UNITED STATES PATENT AND TRADEMARK OFFICE
CERTIFICATE OF CORRECTION

| | | |
|---|---|---|
| PATENT NO. | : 7,653,860 B2 | Page 1 of 1 |
| APPLICATION NO. | : 11/558852 | |
| DATED | : January 26, 2010 | |
| INVENTOR(S) | : Kenton A. Younkin et al. | |

It is certified that error appears in the above-identified patent and that said Letters Patent is hereby corrected as shown below:

Title Page; item (75); IN THE INVENTORS:

Add inventor --Daley; Robert S. (Del Mar, CA)--.

Signed and Sealed this

Second Day of November, 2010

David J. Kappos
*Director of the United States Patent and Trademark Office*